(12) United States Patent
Kanno

(10) Patent No.: US 9,764,730 B2
(45) Date of Patent: Sep. 19, 2017

(54) VEHICLE CONTROL APPARATUS

(71) Applicant: TOYOTA JIDOSHA KABUSHIKI KAISHA, Toyota-shi, Aichi (JP)

(72) Inventor: Yoshihito Kanno, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/115,486

(22) PCT Filed: Dec. 5, 2014

(86) PCT No.: PCT/JP2014/082328
§ 371 (c)(1),
(2) Date: Jul. 29, 2016

(87) PCT Pub. No.: WO2015/118765
PCT Pub. Date: Aug. 13, 2015

(65) Prior Publication Data
US 2017/0166185 A1  Jun. 15, 2017

(30) Foreign Application Priority Data
Feb. 4, 2014  (JP) .................................. 2014-019251

(51) Int. Cl.
*B60W 10/06* (2006.01)
*B60W 10/08* (2006.01)
(Continued)

(52) U.S. Cl.
CPC ............. *B60W 20/14* (2016.01); *B60K 6/445* (2013.01); *B60W 10/06* (2013.01); *B60W 10/08* (2013.01);
(Continued)

(58) Field of Classification Search
CPC ...... B60W 20/14; B60W 10/08; B60W 10/06; B60W 2510/0628; B60W 2710/0622;
(Continued)

(56) References Cited

U.S. PATENT DOCUMENTS

2004/0194746 A1* 10/2004 Yamaoka ................ F02B 11/00
123/90.15

FOREIGN PATENT DOCUMENTS

| JP | H07-259605 A | 10/1995 |
| JP | 2005-069029 A | 3/2005 |
| JP | 2008-121539 A | 5/2008 |

* cited by examiner

*Primary Examiner* — Rodney Butler
(74) *Attorney, Agent, or Firm* — Andrews Kurth Kenyon LLP

(57) ABSTRACT

A vehicle control apparatus is provided with: a first controlling device that controls an internal combustion engine to switch an air fuel ratio after an air intake quantity of the internal combustion engine increases to a first predetermined quantity in switching the internal combustion engine from a first combustion mode to a second combustion mode, the air fuel ratio in the second combustion mode being larger than that in the first combustion mode; and a second controlling device that controls the internal combustion engine to perform a suppression operation for suppressing a decrease of a rotation number of the internal combustion engine during at least one portion of a predetermined period at which the air intake quantity increases due to the switching from the first combustion mode to the second combustion mode.

2 Claims, 4 Drawing Sheets

(51) Int. Cl.
*B60K 6/44* (2007.10)
*F02D 29/02* (2006.01)
*B60W 20/14* (2016.01)
*B60K 6/445* (2007.10)
*F02D 41/00* (2006.01)

(52) U.S. Cl.
CPC ......... *F02D 29/02* (2013.01); *F02D 41/0002* (2013.01); *B60W 2510/0628* (2013.01); *B60W 2710/0622* (2013.01); *B60W 2710/0644* (2013.01); *B60Y 2200/92* (2013.01); *Y10S 903/93* (2013.01)

(58) Field of Classification Search
CPC ........ B60W 2710/0644; F02D 41/0002; F02D 29/02; B60K 6/445; B60Y 2200/92; Y10S 903/93
See application file for complete search history.

[FIG. 1]
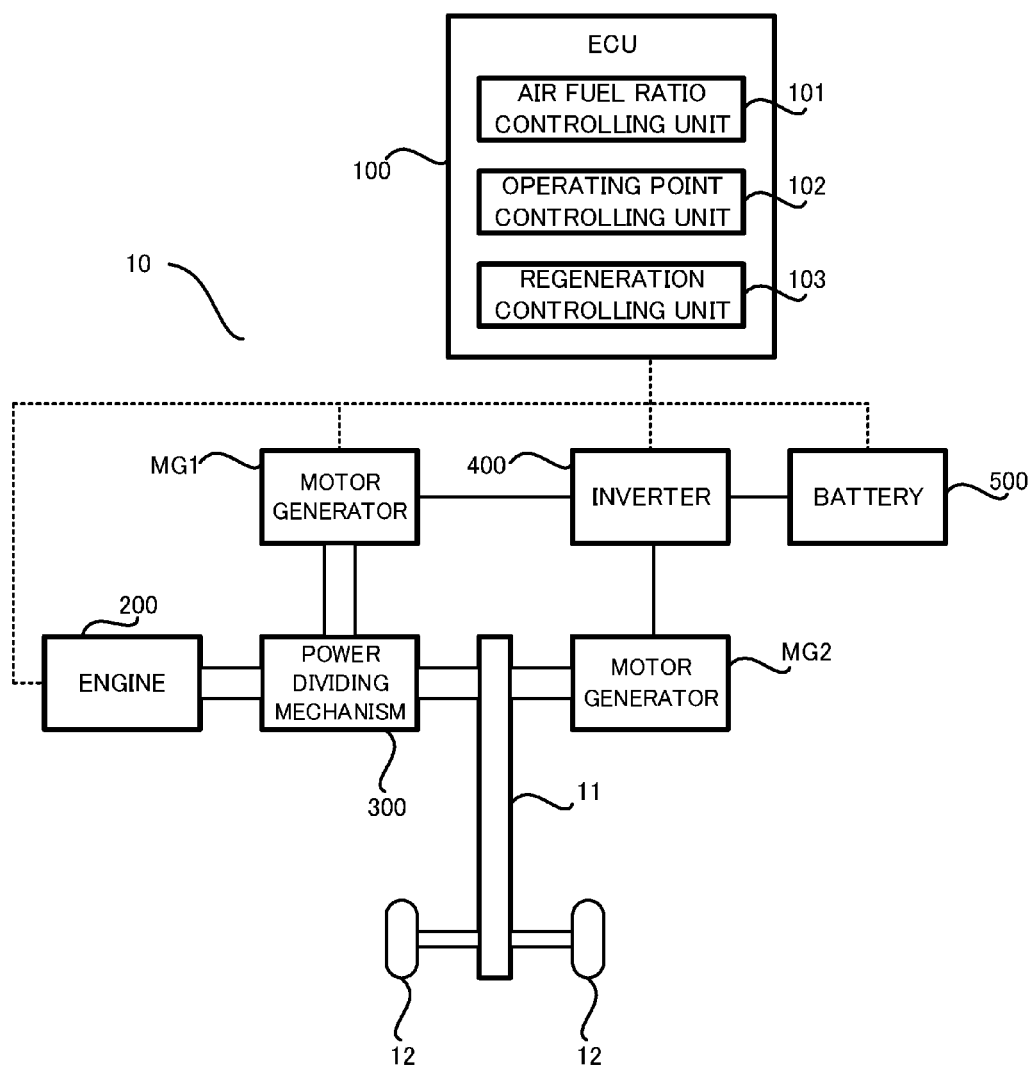

[FIG. 2]
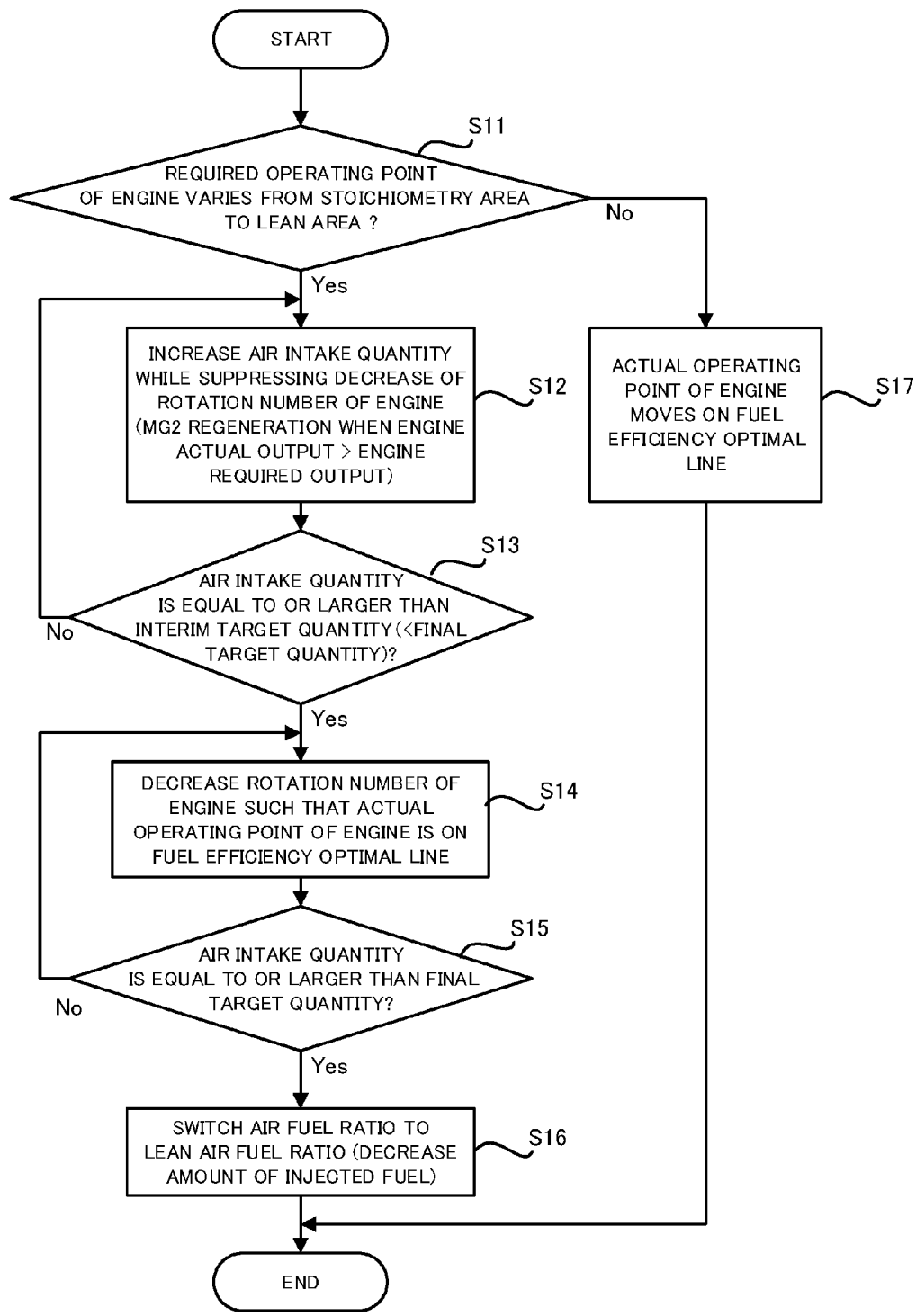

[FIG. 3]
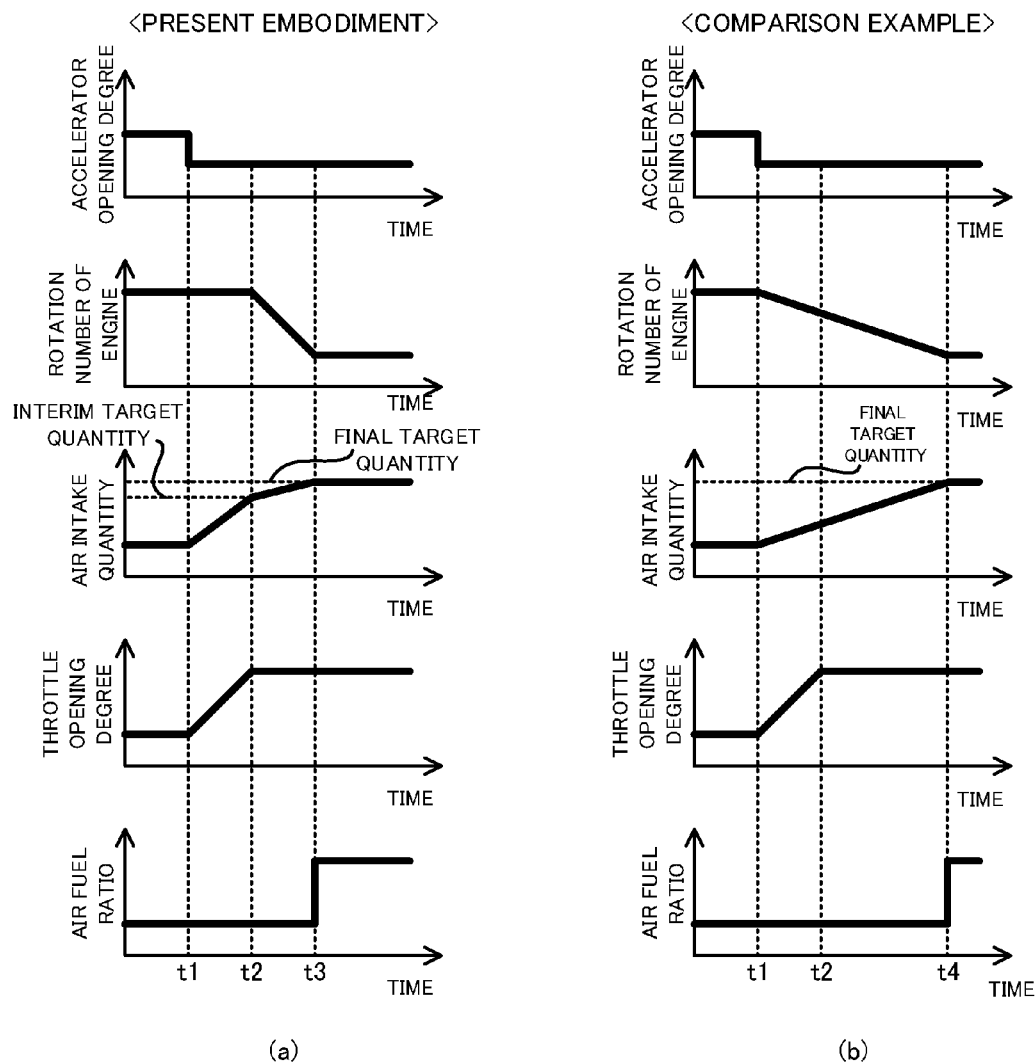

[FIG. 4]
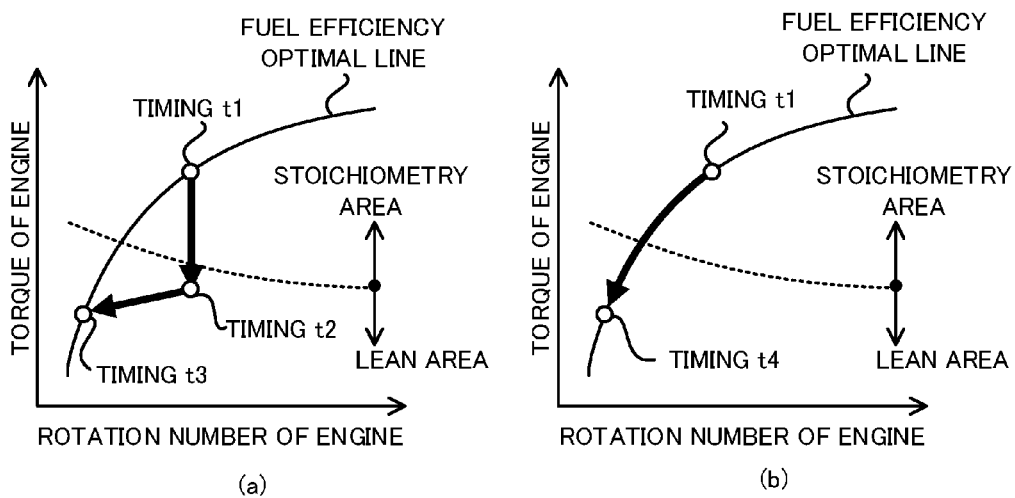
[FIG. 5]
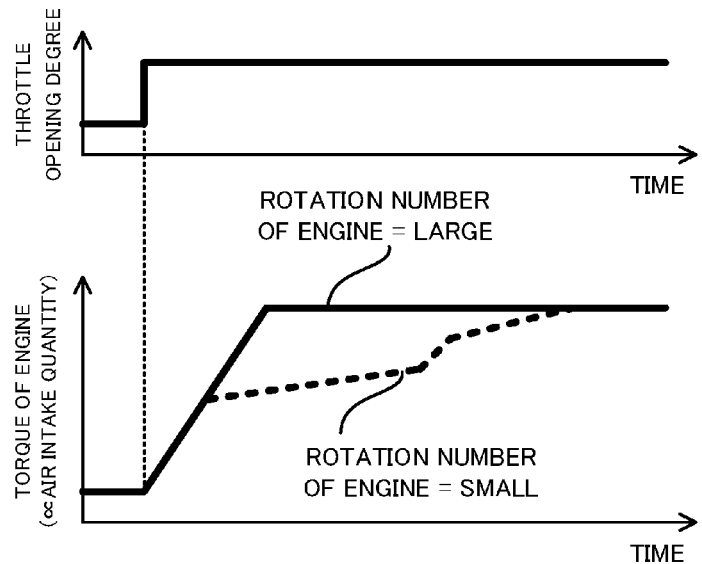

VEHICLE CONTROL APPARATUS

CROSS-REFERENCE TO RELATED APPLICATIONS

This is a national phase application based on the PCT International Patent Application No. PCT/JP2014/082328 filed Dec. 5, 2014, claiming priority to Japanese Patent Application No. 2014-019251 filed Feb. 4, 2014, the entire contents of both of which are incorporated herein by reference.

TECHNICAL FIELD

The present invention relates to a vehicle control apparatus that controls a vehicle, for example.

BACKGROUND ART

An internal combustion engine that is capable of switching an air-fuel ratio in operation is known. For example, a Patent Literature 1 discloses an internal combustion engine that is capable of switching the air fuel ratio between a stoichiometric air fuel ratio (namely, a theoretical air fuel ratio) and a lean air fuel ratio. Here, the internal combustion engine that is disclosed in the Patent Literature 1 operates with the stoichiometric air fuel ratio until an air intake quantity of the internal combustion engine reaches a predetermined value in order to prevent a deterioration of an exhaust property, when the air fuel ratio is switched from the stoichiometric air fuel ratio to the lean air fuel ratio.

Incidentally, there are a Patent Literature 2 and a Patent Literature 3 as background art documents that relate to the present invention. The Patent Literature 2 discloses a technology that delays an ignition timing while keeping the stoichiometric air fuel ratio during a period at which a control of switching a combustion mode is performed and that advances the ignition timing and switches the air fuel ratio to the lean air fuel ratio after the control of switching the combustion mode, when the combustion mode is switched from a non-supercharged stoichiometric combustion mode to a supercharged lean combustion mode. The Patent Literature 3 discloses a technology that increases the air intake quantity of the internal combustion engine and continuously changes the air fuel ratio to follow the change of the air intake quantity, when a switching from an operation with the stoichiometric air fuel ratio to an operation with a lean-side air fuel ratio (namely, the lean air fuel ratio).

CITATION LIST

Patent Literature

[Patent Literature 1] Japanese Unexamined Patent Application Publication No. 2005-069029
[Patent Literature 2] Japanese Unexamined Patent Application Publication No. 2008-121539
[Patent Literature 3] Japanese Unexamined Patent Application Publication No. hei7-259605 (1995-259605)

SUMMARY OF INVENTION

Technical Problem

According to the internal combustion engine that is disclosed in the Patent Literature 1, the operation with the stoichiometric air fuel ratio is performed until the air intake quantity of the internal combustion engine reaches (typically, increases to) the predetermined value. Namely, the air fuel ratio is switched from the stoichiometric air fuel ratio to the lean air fuel ratio after the air intake quantity of the internal combustion engine reaches the predetermined value.

However, there is a possibility that the air intake quantity does not increase relatively easily (namely, an increasing rate of the air intake quantity is relatively small), depending on a condition of the vehicle. For example, when a rotation number of the internal combustion engine is relatively small, a torque of the internal combustion engine is relatively small and thus the air intake quantity does not increase easily, compared to the case where the rotation number of the internal combustion engine is relatively large. When the air intake quantity does not increase easily, a timing at which the air fuel ratio is switched to the lean air fuel ratio is delayed. Thus, there is a possibility that a relatively long time is required to switch the air fuel ratio from the stoichiometric air fuel ratio to the lean air fuel ratio, when the air fuel ratio is simply switched to the lean air fuel ratio after the air intake quantity of the internal combustion engine reaches the predetermined value.

Incidentally, there is a possibility that the relatively long time is required to switch the air fuel ratio, not only when the air fuel ratio is switched from the stoichiometric air fuel ratio to the lean air fuel ratio, but also when the air fuel ratio is switched from a relatively small air fuel ratio to a relatively large air fuel ratio.

The above described problem is listed as one example of the problem that the present invention tries to solve. It is a problem of the present invention to provide a vehicle control apparatus that is capable of reducing a time that is required for the switching from a combustion mode in which the air fuel ratio is relatively small to a combustion mode in which the air fuel ratio is relatively large.

Solution to Problem

<1>

A disclosed vehicle control apparatus is a vehicle control apparatus that controls a vehicle, the vehicle has an internal combustion engine that is capable of switching a combustion mode, the vehicle control apparatus is provided with: a first controlling device that controls the internal combustion engine to switch an air fuel ratio after an air intake quantity of the internal combustion engine increases to a first predetermined quantity in switching the internal combustion engine from a first combustion mode to a second combustion mode, the air fuel ratio in the second combustion mode being larger than that in the first combustion mode; and a second controlling device that controls the internal combustion engine to perform a suppression operation for suppressing a decrease of a rotation number of the internal combustion engine during at least one portion of a predetermined period at which the air intake quantity increases due to the switching from the first combustion mode to the second combustion mode.

According to the disclosed vehicle control apparatus, the internal combustion engine that is capable of switching the combustion mode is controlled. For example, the internal combustion engine is capable of switching the combustion mode between the first combustion mode and the second combustion mode. Incidentally, the first combustion mode is a combustion mode in which the air fuel ratio is smaller than that in the second combustion (namely, in which the air fuel ratio is at a rich side). A stoichiometry combustion mode that is a combustion mode in which the internal combustion engine operates by setting the air fuel ratio to a stoichiometry air fuel ratio (in other words, a theoretical air fuel ratio) is one example of the first combustion mode. On the other hand, the second combustion mode is a combustion mode in which the air fuel ratio is larger than that in the first combustion mode (namely, in which the air fuel ratio is at a lean side). A lean combustion mode that is a combustion mode in which the internal combustion engine operates by setting the air fuel ratio to a lean air fuel ratio (namely, an air fuel ratio that is at the lean side than the stoichiometry air fuel ratio) is one example of the second combustion mode.

In order to control the above described internal combustion engine, the vehicle control apparatus is provided with at least the first controlling device and the second controlling device.

The first controlling device controls the internal combustion engine to switch the air fuel ratio after the air intake quantity of the internal combustion engine increases to the first predetermined quantity in switching the internal combustion engine from the first combustion mode to the second combustion mode. Therefore, under the control of the first controlling device, the air fuel ratio is not switched before the air intake quantity of the internal combustion engine increases to the first predetermined quantity (typically, during a period at which the air intake quantity is smaller than the first predetermined quantity) when the internal combustion engine is switched from the first combustion mode to the second combustion mode. In this case, it is preferable that the air fuel ratio be kept (maintained) at the air fuel ratio of the first combustion mode before the air intake quantity of the internal combustion engine increases to the first predetermined quantity. Then, after the air intake quantity of the internal combustion engine increases to the first predetermined quantity (typically, after the air intake quantity is equal to or larger than the first predetermined quantity), the air fuel ratio is switched to the air fuel ratio of the second combustion mode.

The second controlling device controls the internal combustion engine to perform the suppression operation during at least one portion of the predetermined period at which the air intake quantity increases due to the switching from the first combustion mode to the second combustion mode. The suppression operation is an operation for suppressing the decrease of the rotation number of the internal combustion engine. More specifically, the suppression operation is an operation for suppressing the decrease of the rotation number of the internal combustion engine after the switching from the first combustion mode to the second combustion mode starts. Each of an operation for keeping (maintaining) the rotation number of the internal combustion engine and an operation for increasing the rotation number of the internal combustion engine is one example of the operation for suppressing the decrease of the rotation number of the internal combustion engine, for example.

Here, when the decrease of the rotation number of the internal combustion engine is suppressed, the air intake quantity increases more easily (namely, an increasing rate of the air intake quantity becomes larger), compared to the case where the decrease of the rotation number of the internal combustion engine is not suppressed. Thus, when the decrease of the rotation number of the internal combustion engine is suppressed, a time that is required for the air intake quantity to increase to the first predetermined quantity can be reduced, compared to the case where the decrease of the rotation number of the internal combustion engine is not suppressed. Therefore, when the decrease of the rotation number of the internal combustion engine is suppressed, a switching time from the air fuel ratio of the first combustion mode to the air fuel ratio of the second combustion mode (namely, a time that is required for the switching from the air fuel ratio of the first combustion mode to the air fuel ratio of the second combustion mode) can be reduced, compared to the case where the decrease of the rotation number of the internal combustion engine is not suppressed. Namely, the disclosed vehicle control apparatus is capable of reducing a switching timing from the first combustion mode to the second combustion mode (namely, a time that is required for the switching from the first combustion mode to the second combustion mode).

<2>

In another aspect of the disclosed vehicle control apparatus, the second controlling device (i) performs the suppression operation during a first period of the predetermined period before the air intake quantity increases to a second predetermined quantity that is smaller than the first predetermined quantity and (ii) does not perform the suppression operation during a second period of the predetermined period after the air intake quantity increases to the second predetermined quantity.

According to this aspect, a rapid decrease of the rotation number of the internal combustion engine can be suppressed.

Specifically, if the suppression operation is performed over whole of the predetermined period, there is a possibility that the rotation number of the internal combustion engine starts to decrease relatively rapidly at a timing at which the predetermined period elapses (namely, at a timing at which the air intake quantity increases to the first predetermined quantity). Thus, according to this aspect, the rotation number of the internal combustion engine is allowed to decrease at a timing at which the first period of the predetermined period elapses. Thus, the rapid decrease of the rotation number of the internal combustion engine can be suppressed, compared to the case where the rotation number of the internal combustion engine is allowed to decrease only after the predetermined period elapses.

<3>

In another aspect of the disclosed vehicle control apparatus, the vehicle further has a rotating electrical machine that is connected to the internal combustion engine, the vehicle control apparatus is further provided with: a third controlling device that controls the rotating electrical machine to perform a regeneration by using at least one portion of an output of the internal combustion engine during a period at which the suppression operation is performed.

According to this aspect, at least one portion of the output of the engine that could be excess due to the suppression of the decrease of the rotation number of the internal combustion engine (for example, that is not used for a power running of the vehicle) can be effectively used for the purpose of the regeneration. Thus, a deterioration of a fuel efficiency of the vehicle that is caused by the suppression of the decrease of the rotation number of the internal combustion engine can be suppressed appropriately.

The operation and other advantages of the present invention will become more apparent from embodiments explained below.

BRIEF DESCRIPTION OF DRAWINGS

FIG. 1 is a block diagram that illustrates one example of a structure of a hybrid vehicle in a present embodiment.

FIG. 2 is a flowchart that illustrates a flow of a switching operation for switching an operating state of an engine from a stoichiometric combustion mode to a lean combustion mode.

FIG. 3 are timing charts that illustrate a specific example of parameters that represent a state of the vehicle when the switching operation of the present embodiment is performed and a specific example of the parameters that represents the state of the vehicle when a switching operation of a comparison example is performed.

FIG. 4 are maps for an operating point that illustrates an aspect of a change of the operating point of the engine.

FIG. 5 is a graph that illustrates a relationship between a responsiveness of a torque of the engine that is proportional to an air intake quantity and a rotation number of the engine.

DESCRIPTION OF EMBODIMENTS

Hereinafter, an embodiment of the present invention will be explained with reference to drawings.

(1) Structure of Hybrid Vehicle

Firstly, with reference to FIG. 1, a structure of the vehicle 10 in the present embodiment will be explained. Here, FIG. 1 is a block diagram that illustrates one example of the structure of the vehicle 10 in the present embodiment.

As illustrated in FIG. 1, the vehicle 10 is provided with: an axle shaft 11, wheels 12, an ECU (Electronic Control Unit) 100 that is one specific example of the "vehicle control apparatus"; an engine 200 that is one specific example of the "internal combustion engine"; a motor generator MG1 that is one specific example of the "rotating electrical machine"; a motor generator MG2 that is one specific example of the "rotating electrical machine"; a power dividing mechanism 300; an inverter 400; and a battery 500. Namely, the vehicle 10 is what we call a hybrid vehicle.

The axle shaft 11 is a transmission shaft for transmitting, to the wheels, a power that is outputted from the engine 200 and the motor generator MG2.

The wheel 12 is a component for transmitting, to a road, the power that is transmitted via the below described axle shaft 11. FIG. 1 illustrates an example in which the vehicle 10 is provided with one wheel 12 at each of a right side and a left side. However, it is preferable that the vehicle 10 be provided with one wheel 12 at each of a front right side, a front left side, a rear right side and a rear left side (namely, be provided with total four wheels 12), actually.

The engine 200 functions as a main power source for the vehicle 10. Especially, in the present embodiment, the engine 200 is a lean burn engine (more preferably, a supercharged lean burn engine). Therefore, the engine 200 is capable of operating not only in a stoichiometry combustion mode that performs a combustion with a stoichiometry air fuel ratio (in other words, a theoretical air fuel ratio) but also in a lean combustion mode that performs a combustion with a lean air fuel ratio that is at a lean side than the stoichiometry air fuel ratio, under the control of the ECU 100. Namely, the engine 200 is capable of appropriately switching between the operation in the stoichiometry combustion mode and the operation in the lean combustion mode.

The motor generator MG1 mainly functions as a generator for charging the battery 500 or for supplying an electrical power to the motor generator MG2. Moreover, the motor generator MG1 may function as a motor for assisting a driving power of the engine 200.

The motor generator MG2 mainly functions as a motor for assisting the driving power of the engine 200. Moreover, the motor generator MG2 functions as a generator for charging the battery 500.

The power dividing mechanism 300 is a planetary gear train including a sun gear, a planetary carrier, a pinion gear and a ring gear that are not illustrated. Regarding these gears, a rotational axis of the sun gear that is at an inner circumferential side is coupled with the motor generator MG1, a rotational axis of the ring gear that is at an outer circumferential side is coupled with the motor generator MG2, and a rotational axis of the planetary carrier that is between the sun gear and the ring gear is coupled with the engine 200. A rotational power of the engine 200 is transmitted to the sun gear and the ring gear by the planetary carrier and the pinion gear. As a result, the power of the engine 200 is divided into two lines. In the vehicle 10, the rotational axis of the ring gear is coupled with the axle shaft 11 of the vehicle 10 and the driving power is transmitted to the wheels 12 via the axle shaft 11.

The inverter 400 converts a DC (Direct Current) electrical power that is supplied from the battery 500 into an AC (Alternate Current) electrical power and supplies the AC electrical power to the motor generator MG1 and the motor generator MG2. Moreover, the inverter 400 converts the AC electrical current that is generated by the motor generator MG1 and the motor generator MG2 into the DC electrical power and supplies the DC electrical power to the battery 500. Incidentally, the inverter 400 may be configured as one portion of what we call a PCU (Power Control Unit).

The battery 500 is a rechargeable battery that functions as a supply source of the electrical power for driving the motor generator MG1 and the motor generator MG2. The vehicle 10 may be provided with one battery 500 or may be provided with a plurality of batteries. Incidentally, the vehicle 10 may be provided with one capacitor (for example, an electrical double layer capacitor) or a plurality of capacitors in addition to or instead of the battery 500.

Incidentally, the battery 500 may be charged by the electrical power that is supplied from a power source outside of the vehicle 10 to the vehicle 10. Namely, the vehicle 10 may be a plug-in hybrid vehicle.

The ECU 100 is an electrical controlling unit that is configured to control whole of the operation of the vehicle 10. The ECU 100 includes CPU (Central Processing Unit), a ROM (Read. Only Memory), a RAM (Random Access Memory) and the like.

Especially in the present embodiment, the ECU 100 includes an air fuel ratio controlling unit 101 that is one specific example of the "first controlling device", an operating point controlling unit 102 that is one specific example of the "second controlling device", and a regeneration controlling unit 103 that is one specific example of the "third controlling device", as logical or physical processing blocks that are located inside of the ECU 100.

The air fuel ratio controlling unit 101 controls the air fuel ratio of the engine 200. The operating point controlling unit 102 controls an actual operating point (namely, current or real operating point) of the engine 200 on the basis of a required output of the engine 200. The regeneration controlling unit 103 controls the regeneration of the motor generator MG2. Incidentally, the operations of the air fuel ratio controlling unit 101, the operating point controlling unit 102 and the regeneration controlling unit 103 will be described later in detail with reference to FIG. 2 and so on.

Incidentally, FIG. 1 illustrates, as an example the vehicle 10 (what we call the hybrid vehicle 10) that is provided with both of the motor generator MG1 and the motor generator MG2 and the engine 200. However, the vehicle 10 may not be provided with the motor generator MG1 and the motor generator MG2 (moreover, the inverter 400 and the battery 500). In this case, the vehicle 10 may be provided with a non-stage transmission (for example, a CVT (Continuously Variable Transmission)) instead of the power dividing mechanism 300.

(2) Operation of Vehicle 10

Hereinafter, the operation of the vehicle 10 that has the above described structure will be explained.

(2-1) Basic Operation

When the vehicle 10 moves (runs), a distribution of the power of each of the motor generator MG1 that mainly functions as the generator, the motor generator MG2 that functions as the motor and the engine 200 is controlled by the ECU 100 and the power dividing mechanism 300, and a running condition of the vehicle 10 is controlled.

Here, regarding an operating state of the engine 200, the engine 200 operates such that the actual operating point of the engine 200 moves on a fuel efficiency optimal line (namely, a fuel efficiency optimal line that is represented on a map defined by a rotation number of the engine 200 and a torque of the engine 200) under the control of the operating point controlling unit 102.

Moreover, when a required operating point corresponding to the operating point that is required for the engine 200 varies from a lean area to a stoichiometry area, the air fuel ratio is switched from the lean air fuel ratio to the stoichiometry air fuel ratio under the control of the air fuel ratio controlling unit 101. As a result, the operating state (an operational mode) of the engine 200 is switched from the lean combustion mode to the stoichiometry combustion mode. Incidentally, the stoichiometry area means an area of the operating point at which the engine 200 should operate in the stoichiometry combustion mode. Similarly, the lean area means an area of the operating point at which the engine 200 should operate in the lean combustion mode.

On the other hand, especially in the present embodiment, when the required operating point of the engine 200 varies from the stoichiometry area to the lean area, the engine 200 operates in accordance with a below described switching operation. Namely, when the required operating point of the engine 200 varies from the stoichiometry area to the lean area, the operating state of the engine 200 is switched from the stoichiometry combustion mode to the lean combustion mode in accordance with the below described switching operation. Hereinafter, the switching operation for switching the operating state of the engine 200 from the stoichiometry combustion mode to the lean combustion mode will be explained.

(2-2) Switching Operation from Stoichiometric Combustion Mode to Lean Combustion Mode With reference to FIG. 2, the switching operation for switching the operating state of the engine 200 from the stoichiometry combustion mode to the lean combustion mode will be explained. FIG. 2 is a flowchart that illustrates a flow of the switching operation for switching the operating state of the engine 200 from the stoichiometry combustion mode to the lean combustion mode.

As illustrated in FIG. 2, firstly, the operating point controlling unit 102 determines whether or not the required operating point of the engine 200 varies from the stoichiometry area to the lean area (step S11). Namely, the operating point controlling unit 102 determines, under the situation where the actual operating point that is the current or real operating point of the engine 200 is located in the stoichiometry area, whether or not new required operating point is newly located in the lean area (step S11).

Incidentally, the required operating point is determined on the basis of an engine required output that is determined depending on a speed of the vehicle 10, an operation of an accelerator pedal by a driver (namely, an accelerator opening degree (accelerator position)) and the like. Therefore, the required operating point could vary every time the speed and the operation of the accelerator pedal vary. Therefore, it is preferable that the operating point controlling unit 102 determine, every time new required operation point is calculated, whether or not the required operating point varies from the stoichiometry area to the lean area.

As a result of the determination at the step S11, when it is determined that the required operating point of the engine 200 does not vary from the stoichiometry area to the lean area (step S11: No), the operating state of the engine 200 is not necessarily switched from the stoichiometry combustion mode to the lean combustion mode. Therefore, in this case, as described in the above basic operation, the operating point controlling unit 102 controls the operating state of the engine 200 such that the actual operating point of the engine 200 moves on (namely, traces) the fuel efficiency optimal line (step S17).

On the other hand, as a result of the determination at the step S11, when it is determined that the required operating point of the engine 200 varies from the stoichiometry area to the lean area (step S11: Yes), the ECU 100 increases an opening degree of an throttle valve in order to switch the operating state of the engine 200 to the lean combustion mode. As a result, an air intake quantity of the engine 200 increases (step S12).

At this time, in the present embodiment, the operating point controlling unit 102 controls the operating state of the engine 200 to suppress a decrease of the rotation number of the engine 200 (step S12). Namely, in the present embodiment, the air intake quantity of the engine 200 increases while the decrease of the rotation number of the engine 200 is suppressed. At this time, the operating point controlling unit 102 may not control the operating state of the engine 200 such that the actual operating point of the engine 200 moves on the fuel efficiency optimal line. In other words, the operating point controlling unit 102 may control the operating state of the engine 200 such that the actual operating point of the engine 200 is located on a position that is different from the fuel efficiency optimal line.

The "suppression of the decrease of the rotation number of the engine 200" means the suppression of the decrease of the rotation number during at least one portion of a period after it is determined that the required operating point of the engine 200 varies from the stoichiometry area to the lean area. For example, the "suppression of the decrease of the rotation number of the engine 200" may mean the suppression of the decrease from the rotation number at a timing at which it is determined that the required operating point varies from the stoichiometry area to the lean area.

The operating point controlling unit 102 may keep (maintain) the rotation number of the engine 200 in order to suppress the decrease of the rotation number of the engine 200. For example, the operating point controlling unit 102 may keep the rotation number of the engine 200 at a rotation number at the timing at which it is determined that the required operating point varies from the stoichiometry area to the lean area.

The operating point controlling unit 102 may increase the rotation number of the engine 200, in addition to or instead of keeping the rotation number of the engine 200, in order to suppress the decrease of the rotation number of the engine 200. Namely, the operating point controlling unit 102 may increases the rotation number of the engine 200 to a rotation number that is larger than the rotation number at the timing at which it is determined that the required operating point varies from the stoichiometry area to the lean area.

Incidentally, when the operating point controlling unit 102 increases the rotation number in order to suppress the decrease of the rotation number, the operating point controlling unit 102 may decrease the rotation number in addition to or instead of increasing the rotation number, as long as the rotation number is not below the rotation number at the timing at which it is determined that the required operating point varies from the stoichiometry area to the lean area. Alternatively, the operating point controlling unit 102 may suitably repeat an operation for increasing the rotation number and then decreasing the rotation number as long as the rotation number is not below the rotation number at the timing at which it is determined that the required operating point varies from the stoichiometry area to the lean area. As a result, an unlimited or excessive increase of the rotation number due to the suppression of the decrease of the rotation number can be prevented.

By the way, when the decrease of the rotation number of the engine 200 is suppressed, there is a possibility the engine actual output that is an actual output of the engine 200 is larger than the engine required output. In this case, the regeneration controlling unit 103 may control the motor generator MG2 such that the motor generator MG2 performs the regeneration (namely, generates the electrical power) by using an excess (surplus) of the engine actual output (namely, the engine actual output—the engine required output).

However, as described above, the vehicle 10 that is not provided with the motor generator MG1 and the motor generator MG2 may be used, instead of the vehicle 10 that is provided with the motor generator MG1 and the motor generator MG2. In the vehicle 10 that is not provided with the motor generator MG1 and the motor generator MG2, when the engine actual output is larger than the engine required output, the excess of the engine actual output may be canceled by adjusting an ignition angle of the engine 200 (for example, by delaying it than usual angle).

Incidentally, the air fuel ratio controlling unit 101 may not switch the air fuel ratio to the lean air fuel ratio during a period during which the step S12 is performed. Namely, the air fuel ratio controlling unit 101 may keep the air fuel ratio at the stoichiometry air fuel ratio. For example, the air fuel ratio controlling unit 101 may keep the air fuel ratio at the stoichiometry air fuel ratio by controlling a fuel injection device to adjust (for example, increase) an amount of the injected fuel on the basis of an increasing amount of the air intake quantity of the engine 200.

Then, the operating point controlling unit 102 determines whether or not the air intake quantity of the engine 200 is equal to or larger than an interim target quantity (step S13). Here, the interim target quantity is a value that is smaller than a final target quantity, the final target quantity is a target value for the air intake quantity when the engine 200 operates in the lean combustion mode. For example, the interim target quantity may be a value that is obtained by multiplying the final target quantity by a predetermined coefficient (factor). It is preferable that the predetermined coefficient be larger than 0 and smaller than 1. 0.9 is one example of the above described coefficient, for example. Of course, a value that is different from 0.9 may be used as the predetermine coefficient. Incidentally, the final target quantity and the interim target quantity are examples of the "first predetermined quantity" and the "second predetermined quantity", respectively.

As a result of the determination at the step S13, when it is determined that the air intake quantity of the engine 200 is not equal to or larger than the interim target quantity (step S13: No), the operation at the step S12 is repeated. Namely, the air intake quantity of the engine 200 further increases while the decrease of the rotation number of the engine 200 is suppressed.

On the other hand, as a result of the determination at the step S13, when it is determined that the air intake quantity of the engine 200 is equal to or larger than the interim target quantity (step S13: Yes), the operating point controlling unit 102 terminates the operation for suppressing the decrease of the rotation number of the engine 200 and then controls the operating state of the engine 200 such that the actual operating point of the engine 200 is located on the fuel efficiency optimal line (step S14). As a result, the rotation number of the engine 200 decreases until the actual operating point of the engine 200 is located on the fuel efficiency optimal line.

Then, the air fuel ratio controlling unit 101 determines whether or not the air intake quantity of the engine 200 is equal to or larger than the final target quantity (step S15). Incidentally, as described above, the final target quantity is the target value for the air intake quantity when the engine 200 operates in the lean combustion mode.

As a result of the determination at the step S15, when it is determined that the air intake quantity of the engine 200 is not equal to or larger than the final target quantity (step S15: No), the operation at the step S14 is repeated. Namely, the operating point controlling unit 102 keeps controlling the operating state of the engine 200 such that the actual operating point of the engine 200 is on the fuel efficiency optimal line.

On the other hand, as a result of the determination at the step S15, when it is determined that the air intake quantity of the engine 200 is equal to or larger than the final target quantity (step S15: Yes), the air fuel ratio controlling unit 101 switches the air fuel ratio from the stoichiometry air fuel ratio to the lean air fuel ratio (step S16). For example, the air fuel ratio controlling unit 101 may switches the air fuel ratio to the lean air fuel ratio by controlling the fuel injection device to adjust (for example, decrease) the amount of the injected fuel such that the air fuel ratio becomes the lean air fuel ratio. As a result, the operating state of the engine 200 is switched from the stoichiometry combustion mode to the lean combustion mode.

Here, with reference to FIG. 3 to FIG. 5, a specific example of the state of the vehicle 10 when the switching operation of the present embodiment is performed will be explained. Hereinafter, the specific example of the state of the vehicle 10 when the switching operation in the present embodiment that suppresses the decrease of the rotation number of the engine 200 when the air intake quantity is increased is performed will be explained by comparing this example to a specific example of the state of the vehicle 10 when a switching operation in a comparison example that does not suppresses the decrease of the rotation number of the engine 200 (namely, keeps the operating point of the engine 200 on the fuel efficiency optimal line) when the air intake quantity is increased is performed. FIG. 3 are timing charts that illustrate the specific example of parameters that represent the state of the vehicle 10 when the switching operation in the present embodiment is performed (FIG. 3(*a*)) and the specific example of the parameters that represent the state of the vehicle 10 when the switching operation in the comparison example is performed (FIG. 3(*b*)). FIG. 4 are maps for the operating point that illustrate the operating point of the engine 200. FIG. 5 is a graph that illustrates a relationship between a responsiveness of the torque of the engine 200 that is proportional to the air intake quantity and the rotation number of the engine 200.

As illustrated in FIG. 3(*a*) and FIG. 3(*b*), it is assumed that it is determined at a timing t1 that the required operating point of the engine 200 varies from the stoichiometry area to the lean area, in both of the switching operation in the present embodiment and the switching operation in the comparison example. Incidentally, the top timing chart in each of FIG. 3(*a*) and FIG. 3(*b*) illustrates an example in which a trigger for the variation of the required operating point from the stoichiometry area to the lean area is an operation for returning the accelerator pedal by the driver (namely, the decrease of the accelerator opening degree).

As a result, as illustrated in the fourth top timing chart in each of FIG. 3(*a*) and FIG. 3(*b*), the opening degree of the throttle valve starts to increase at the timing t1. As a result, as illustrated in the third top timing chart in each of FIG. 3(*a*) and FIG. 3(*b*), the air intake quantity of the engine 200 starts to increase at the timing t1.

Here, in the comparison example, as illustrated in FIG. 4(*b*), the actual operating point of the engine 200 moves on the fuel efficiency optimal line. As a result, in the comparison example, as illustrated in the second top timing chart in FIG. 3(*b*), the rotation number of the engine 200 starts to decrease at the timing t1. Then, the air fuel ratio is switched from the stoichiometry air fuel ratio to the lean air fuel ratio at a timing t4 at which the air intake quantity reaches the final target quantity.

On the other hand, in the present embodiment, as illustrated in the second top timing chart in FIG. 3(*a*), the decrease of the rotation number of the engine 200 is suppressed during a period from the timing t1 to a timing t2 at which the air intake quantity reaches the interim target quantity. Since the decrease of the rotation number of the engine 200 is suppressed, the actual operating point of the engine 200 does not move on the fuel efficiency optimal line during the period from the timing t1 to the timing t2, as illustrated in FIG. 4(*a*). Then, the rotation number of the engine 200 decreases during a period from the timing t2 to a timing t3 at which the air intake quantity reaches the final target quantity. At this time, the actual operating point of the engine 200 moves toward the fuel efficiency optimal line during the period from the timing t2 to the timing t3. Then, the air fuel ratio is switched from the stoichiometry air fuel ratio to the lean air fuel ratio at the timing t3 at which the air intake quantity reaches the final target quantity.

In this case, in the comparison example, a time (switching required time) that is required for the air fuel ratio to be actually switched to the lean air fuel ratio after it is determined that the required operating point of the engine 200 varies from the stoichiometry area to the lean area is "the timing t4–the timing t1". On the other hand, in the present embodiment, the switching required time is "the timing t3–the timing t1". As illustrated in FIG. 3(*a*) and FIG. 3(*b*), the switching required time in the present embodiment is smaller than the switching required time in the comparison example. Hereinafter, the reason why the switching required time in the present embodiment is smaller than the switching required time in the comparison example will be explained.

As illustrated in FIG. 5, when the rotation number of the engine 200 is relatively large, the responsiveness (for example, a speed of a response) of the torque of the engine 200 improves more than that in the case where the rotation number of the engine 200 is relatively small. Considering that the torque of the engine 200 is proportional to the air intake quantity, when the rotation number of the engine 200 is relatively large, an increasing rate of the air intake quantity becomes large (namely, the air intake quantity increases more easily) than that in the case where the rotation number of the engine 200 is relatively small. Therefore, as illustrated in the third top timing chart in each of FIG. 3(*a*) and FIG. 3(*b*), the increasing rate of the air intake quantity in the present embodiment in which the decrease of the rotation number of the engine 200 is suppressed is larger than that in the comparison example in which the decrease of the rotation number of the engine 200 is not suppressed. Considering that the air fuel ratio is switched to the lean air fuel ratio at the timing at which the air intake quantity increases to the final target quantity, the increasing rate of the air intake quantity is substantially inversely proportional to the switching required time that is required for the air fuel ratio to be actually switched to the lean air fuel ratio after it is determined that the required operating point of the engine 200 varies from the stoichiometry area to the lean area. Namely, the larger the increasing rate of the air intake quantity is, the smaller the switching required time is. Thus, the switching required time in the present embodiment in which the increasing rate of the air intake quantity is relatively large because the decrease of the rotation number of the engine 200 is suppressed is smaller than the switching required time in the comparison example in which the increasing rate of the air intake quantity is relatively small because the decrease of the rotation number of the engine 200 is not suppressed.

As described above, in the vehicle 10 in the present embodiment, it is possible to appropriately reduce the switching required time that is required for the air fuel ratio to be actually switched to the lean air fuel ratio after it is determined that the required operating point of the engine 200 varies from the stoichiometry area to the lean area is appropriately reduced. Namely, it is possible to appropriately reduce a switching required time that is required for the operating state of the engine 200 to be switched from the stoichiometry combustion mode to the lean combustion mode.

This effect of the reduction of the switching required time is particularly effective in the case where the engine 200 is the supercharged lean burn engine. This is because a rotation number of a turbine of a supercharger is relatively small when the rotation number of the engine 200 is relatively small and thus the air intake quantity does not increases easily. However, in the present embodiment, since the decrease of the rotation number of the engine 200 is suppressed, the decrease of the rotation number of the turbine of the supercharger is also suppressed, and thus the air intake quantity increases easily. Therefore, the switching required time is appropriately reduced.

In addition, in the present embodiment, the operation for suppressing the decrease of the rotation number of the engine 200 is performed only before the air intake quantity increases to the interim target quantity that is smaller than the final target quantity. Namely, in the present embodiment, the operation for suppressing the decrease of the rotation number of the engine 200 is not performed during a period during which the air intake quantity is equal to or larger than the interim target quantity and is equal to or smaller than the final target quantity. If the operation for suppressing the decrease of the rotation number of the engine 200 is performed during the period during which the air intake quantity is equal to or larger than the interim target quantity and is equal to or smaller than the final target quantity, there is a possibility that the rotation number of the engine 200 decreases rapidly at a timing at which the air intake quantity is equal to or larger than the final target quantity. However, in the present embodiment, the rotation number of the engine 200 is allowed to decrease after the air intake quantity is equal to or larger than the interim target quantity. Thus, the rapid decrease of the rotation number of the engine 200 is suppressed, compared to the case where the rotation number of the engine 200 is allowed to decrease after the air intake quantity is equal to or larger than the final target quantity Incidentally, when the interim target quantity is the value that is obtained by multiplying the final target quantity by the predetermined coefficient, the smaller the predetermined coefficient is, the sooner the rotation number of the engine 200 starts to be allowed to decrease. The sooner the rotation number of the engine 200 starts to be allowed to decrease, the more the rapid decrease of the rotation number of the engine 200 is suppressed, however, the air intake quantity does not increase relatively easily. On the other hand, the larger the predetermined coefficient is, the later the rotation number of the engine 200 starts to be allowed to decrease. The later the rotation number of the engine 200 starts to be allowed to decrease, the more easily the air intake quantity increases, however, the rapid decrease of the rotation number of the engine 200 is not suppressed easily. Thus, it is preferable that the appropriate predetermined coefficient (alternatively, the interim target quantity) be set while considering a balance between an easiness of the increase of the air intake quantity and a degree of the suppression of the rapid decrease of the rotation number of the engine 200.

However, from a viewpoint of allowing the air intake quantity to increase easily, the operating point controlling unit 102 may control the operating state of the engine 200 to suppress the decrease of the rotation number of the engine 200 even in the period at which the air intake quantity is equal to or larger than the interim target quantity and is equal to or smaller than the final target quantity. In this case, the operating point controlling unit 102 may terminate the operation for suppressing the decrease of the rotation number of the engine 200 at a timing at which the air intake quantity is equal to or larger than the final target quantity and then controls the operating state of the engine 200 such that the actual operating point of the engine 200 is located on the fuel efficiency optimal line.

In addition, in the present embodiment, when the engine actual output is larger than the engine required output due to the suppression of the decrease of the rotation number of the engine 200, the motor generator MG2 is capable of generating the electrical power by using the excess of the engine actual output. Namely, at least one portion of the engine actual output that is the excess (for example, that is not used for a power running of the vehicle 10) due to the suppression of the decrease of the rotation number of the engine 200 can be effectively used. Thus, a deterioration of the fuel efficiency of the vehicle 10 that is caused by the suppression of the decrease of the rotation number of the engine 200 can be suppressed appropriately.

Incidentally, in the above described explanation, the stoichiometry combustion mode and the lean combustion mode are used as the operating states of the engine 200. However, a first combustion mode and a second combustion mode in which the air fuel ratio is larger (namely, the air fuel ratio is at a lean side) than that in the first combustion mode may be used as the operating states of the engine 200, instead of the stoichiometry combustion mode and the lean combustion mode. In this case, an operation that is based on the above described "switching operation for switching the operating state of the engine 200 from the stoichiometry combustion mode to the lean combustion mode (however, the stoichiometry combustion mode and the lean combustion mode are replaced with the first combustion mode and the second combustion mode, respectively)" is performed when the operating state of the engine 200 is switched from the first combustion mode to the second combustion mode.

Specifically, for example, a rich combustion mode (namely, the operational mode in which the air fuel ratio becomes a rich air fuel ratio that is at a rich side than the stoichiometric air fuel ratio) and the lean combustion mode may be used instead of the stoichiometric combustion mode and the lean combustion mode. In this case, an operation that is based on the above described "switching operation for switching the operating state of the engine 200 from the stoichiometry combustion mode to the lean combustion mode (however, the stoichiometry combustion mode is replaced with the rich second combustion mode)" is performed when the operating state of the engine 200 is switched from the rich combustion mode to the lean combustion mode.

Alternatively, for example, the rich combustion mode and the stoichiometric combustion mode may be used instead of the stoichiometric combustion mode and the lean combustion mode. In this case, an operation that is based on the above described "switching operation for switching the operating state of the engine 200 from the stoichiometry combustion mode to the lean combustion mode (however, the stoichiometry combustion mode and the lean combustion mode are replaced with the rich combustion mode and the stoichiometric combustion mode, respectively)" is performed when the operating state of the engine 200 is switched from the rich combustion mode to the stoichiometric combustion mode.

Moreover, in the above described explanation, the vehicle 10 uses a hybrid system of what we call a split (power dividing) type (for example, a THS (Toyota Hybrid System)). Namely, in the above described explanation, the vehicle 10 uses a hybrid system in which the power of the engine 200, the power of the motor generator MG1 that mainly functions as the generator and the power of the motor generator MG2 that mainly functions as the motor are distributed (divided) appropriately by the power dividing mechanism 300. However, the vehicle 10 may use a hybrid system of a series type or a parallel type that uses the non-stage transmission (for example, the CVT (Continuously Variable Transmission)) in addition to or instead of the power dividing mechanism 300. Even in the hybrid system of the series type or the parallel type that uses the non-stage transmission, the above described "switching operation for switching the operating state of the engine 200 from the stoichiometric combustion mode to the lean combustion mode" may be applied.

The present invention can be changed, if desired, without departing from the essence or spirit of the invention which can be read from the claims and the entire specification. A vehicle control apparatus, which involves such changes, is also intended to be within the technical scope of the present invention.

REFERENCE SIGNS LIST 10 vehicle
100 ECU 101 air fuel ratio control unit
102 operating point control unit
103 regeneration control unit
200 engine
300 power dividing mechanism
400 inverter
500 battery
MG1, MG2 motor generator

The invention claimed is:

1. A vehicle control apparatus that controls a vehicle,
the vehicle having an internal combustion engine that is capable of switching a combustion mode,
the vehicle control apparatus comprising a controller,
the controller being programmed to:
control the internal combustion engine to switch an air fuel ratio after an air intake quantity of the internal combustion engine increases to a first predetermined quantity in switching the internal combustion engine from a first combustion mode to a second combustion mode, the air fuel ratio in the second combustion mode being larger than that in the first combustion mode;
control the internal combustion engine to perform a suppression operation for suppressing a decrease of a rotation number of the internal combustion engine such that the rotation number of the internal combustion engine is not below a first number during a first period, the first number being a rotation number of the internal combustion engine at a timing at which it is determined that the combustion mode is to be switched to the second combustion mode,
the first period being one portion of a predetermined period and being a period before the air intake quantity increases to a second predetermined quantity that is smaller than the first predetermined quantity,
the predetermined period being a period at which the air intake quantity increases due to the switching from the first combustion mode to the second combustion mode; and
control the internal combustion engine not to perform the suppression operation during a second period of the predetermined period after the air intake quantity increases to the second predetermined quantity,
the first predetermined quantity being a final target quantity for the air intake quantity when the internal combustion engine operates at the second combustion mode,
the second predetermined quantity being an interim target quantity for the air intake quantity that is smaller than the first predetermined quantity.

2. The vehicle control apparatus according to claim 1, wherein
the vehicle further has a rotating electrical machine that is connected to the internal combustion engine,
the controller is further programmed to control the rotating electrical machine to perform a regeneration by using at least one portion of an output of the internal combustion engine during a period at which the suppression operation is performed.

* * * * *